Oct. 18, 1938. J. Q. SHERMAN Re. 20,888
PIN FEED PLATEN ROLL
Original Filed June 8, 1931 3 Sheets-Sheet 1
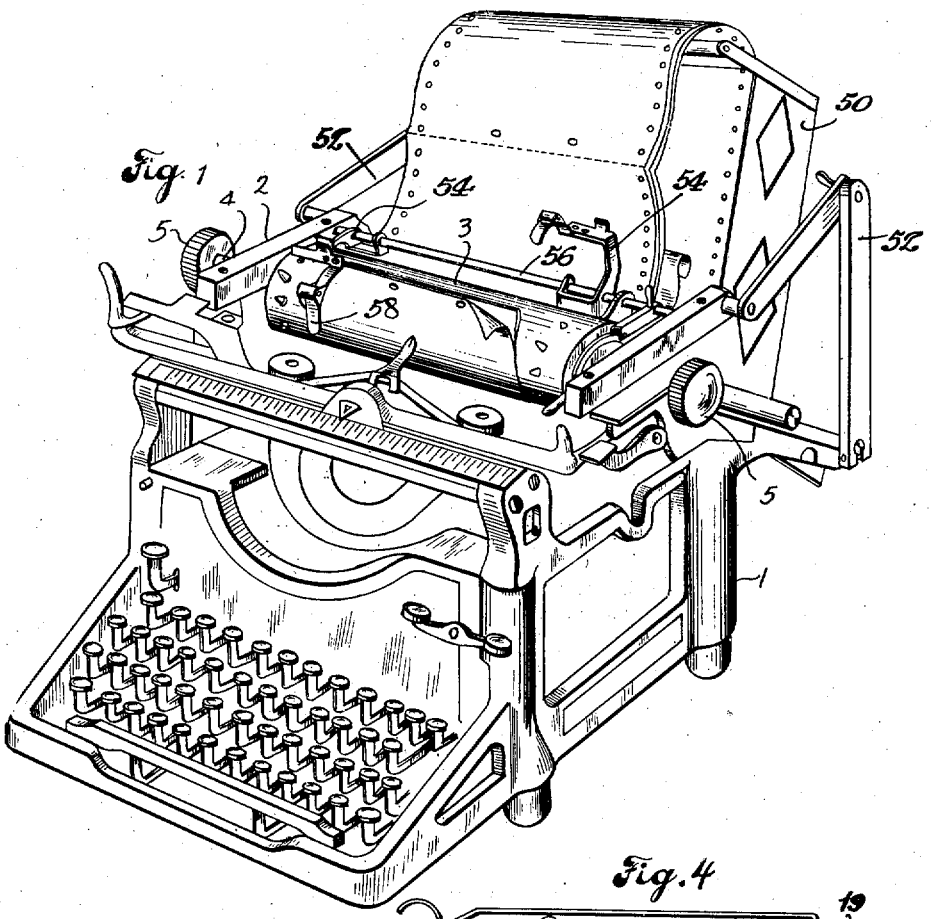
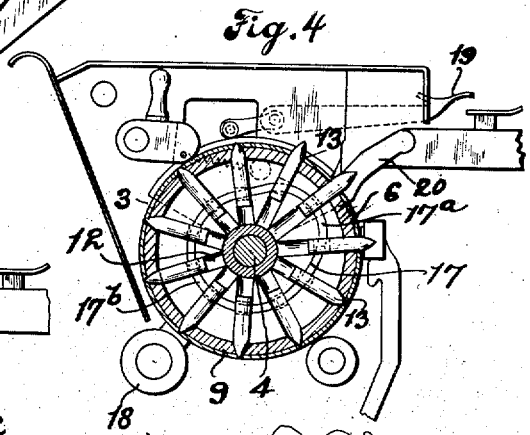
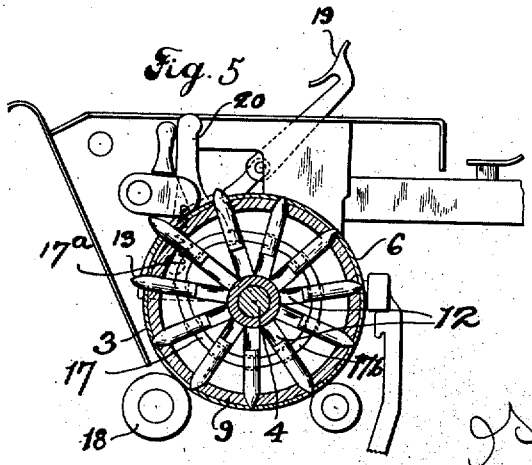
INVENTOR.
BY
ATTORNEYS.

Oct. 18, 1938. J. Q. SHERMAN Re. 20,888

PIN FEED PLATEN ROLL

Original Filed June 8, 1931 3 Sheets-Sheet 2

INVENTOR.

John Q. Sherman

BY

L. L. Walker ATTORNEYS.

Oct. 18, 1938. J. Q. SHERMAN Re. 20,888

PIN FEED PLATEN ROLL

Original Filed June 8, 1931 3 Sheets-Sheet 3

John Q. Sherman INVENTOR.

BY

H. E. Walker ATTORNEYS.

Reissued Oct. 18, 1938 Re. 20,888

UNITED STATES PATENT OFFICE 20,888

PIN FEED PLATEN ROLL

John Q. Sherman, Dayton, Ohio, assignor to The Standard Register Company

Original No. 2,000,649, dated May 7, 1935, Serial No. 542,855, June 8, 1931. Application for reissue February 16, 1937, Serial No. 126,100

46 Claims. (Cl. 197—133)

Figure 2:
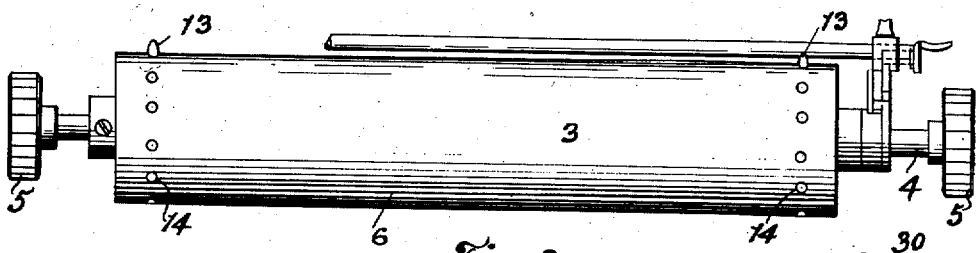

This invention relates to writing machines, and more particularly to paper feeding means for feeding superposed record sheets and interleaved carbon sheets circumferentially about a cylindrical platen, and maintaining such sheets in accurate registry at the writing line.

The use of continuous stationery wherein a succession of printed writing forms are detachably connected end to end in continuous supply strips which are superposed one upon another and interleaved with continuous strips of "one time" carbon material for manifolding purposes has become quite common.

It is generally recognized that however carefully and accurately such strips may be printed, when superposed one upon another they will not register throughout, but require a slight degree of relative adjustment simultaneously with their feeding movement to maintain their registry at the writing position.

The ordinary friction feed typewriter mechanism will not maintain the registry of such superposed forms during the feeding operation.

The present invention pertains to the provision of retractable feeding pins in the periphery of a platen roll which, as the roll rotates, are automatically extended and retracted in sequence whereby the punched manifolding strips will be engaged by the pins only at the writing line or closely adjacent thereto and will be automatically stripped from the pins by withdrawal of the latter without strain or disturbance after passing the writing position.

The superposed strips are thus left free to adjust relative to each other as they approach the writing position, and punched carbon material may be successfully fed without undue strain, and transverse division lines of the carbon material can be maintained in accurate registry with those of the record strips at the "tear off" point.

This construction enables the substitution of the pin feed platen roll in standard types of typewriters as the feeding pins, being subject to retraction about the roll except adjacent to the writing line, avoid interference with the usual friction or pressure roll and other parts of the machine adjacent to the platen roll.

Furthermore in the present construction means is provided for retracting the feeding pins at the writing line at will and thus enabling the typewriter to be used in the ordinary manner merely as a friction feed mechanism.

The object of the invention is to simplify the construction as well as the means and mode of operation of pin wheel feed devices as applied to typewriters wherein the record and manifolding material circumferentially conform to the platen roll, whereby they will not only be cheap and economical in construction, but will be more efficient in use, automatic in action, uniform in operation, of sturdy construction and unlikely to get out of repair.

A further object of the invention is to provide for automatic adjustment of superposed manifolding strips as they travel about a platen roll, to a considerable arc of which they conform.

A further object of the invention is to enable the feeding of a large number of superposed apertured strips in accurate registry at the writing line, the apertures of which are offset relative to each other due to the travel of the strips about the platen roll in paths of different diameter.

A further object of the invention is to provide means for uniformly and smoothly stripping the engaged strips from the feeding pins without the necessity of special stripping devices, and without strain upon or disturbance of the uniform movement of the strips.

A further object of the invention is to provide pin wheel feeding means which will successfully feed punched carbon sheets interleaved between the record sheets without undue strain thereon, and without tearing or other multilation, and which will automatically maintain the registry of the carbon sheets with over and under-lying record sheets.

A further object of the invention is to provide retractable feeding pins which will be automatically extended and retracted as the platen roll is rotated whereby the pins will engage with the punched paper only at, or closely adjacent to the writing line and wherein the pins will be retracted when passing adjacent parts of the mechanism and hence avoid interference therewith.

A further object of the invention is to provide a pin feed platen roll which can be readily and easily substituted for the usual platen roll of standard typewriting machines.

A further object of the invention is to provide control means for the retractable feeding pins whereby the pins may be retracted at the writing point and adjacent thereto, or the protruding pins shifted to an inoperative portion of the roll area wherein they will not engage with the paper supply and thus afford a smooth working area of the platen for the usual friction feed operation and enabling the use of unpunched paper upon the same platen roll.

A further object of the invention is to automatically prevent the operation of the friction feed mechanism while the pins are feeding the paper.

With the above primary and other incidental objects in view, as will more fully appear in the specification, the invention consists of the features of construction, the parts and combinations thereof and the mode of operation, or their equivalents, as hereinafter described and set forth in the claims.

Figure 3:
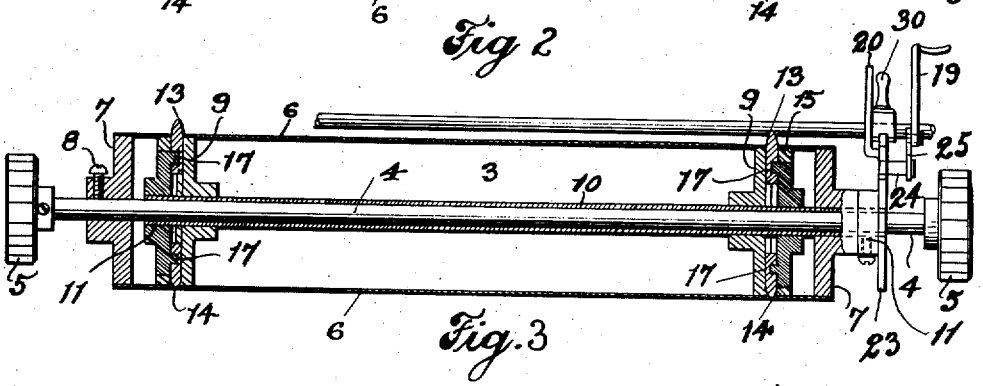
Figure 8:
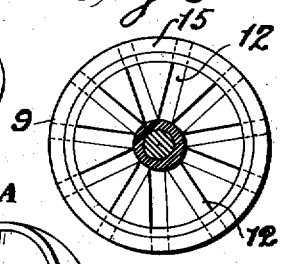
Figure 6:
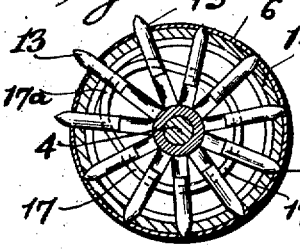
Figure 7:
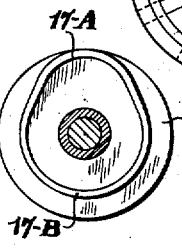

Referring to the accompanying drawings wherein is shown the preferred, but obviously not necessarily, the only form of the embodiments of the invention, Fig. 1 is a perspective view of the traveling carriage of a popular type of writing machine in which the pin feed platen, forming the subject matter hereof, has been substituted for the standard platen roll. Fig. 2 is a side elevation of the platen roll removed from the typewriter. Fig. 3 is a longitudinal sectional view of the pin feed platen roll. Fig. 4 is a transverse sectional view through the typewriter carriage showing the parts adjusted for pin feed operation. Fig. 5 is a similar view wherein the parts are shown relatively positioned for friction feed operation. Fig. 6 is a transverse sectional view of the platen roll. Fig. 7 is a detail view of the actuating cam removed from the platen roll. Fig. 8 is a detail face view of the platen roll head showing the pin groove for guiding the pins radially as they travel about the cam.

Figure 9:
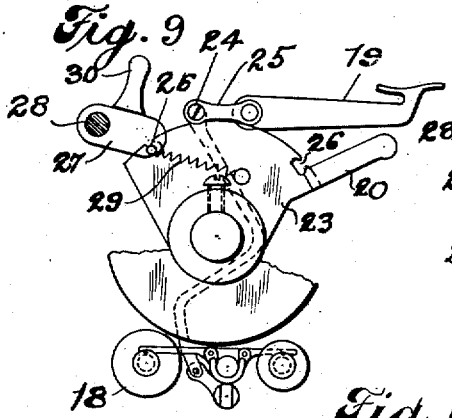
Figure 10:
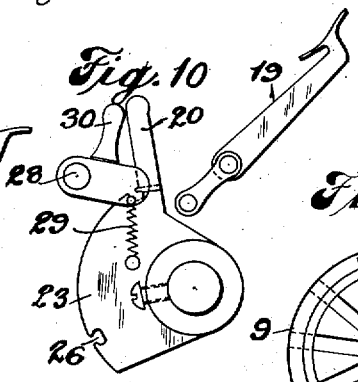
Figure 11:
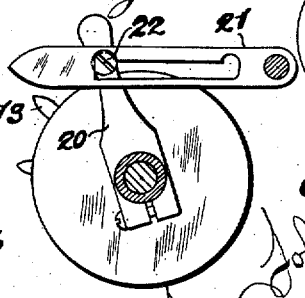
Figure 12:
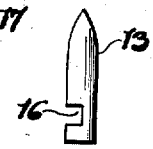
Figure 13:
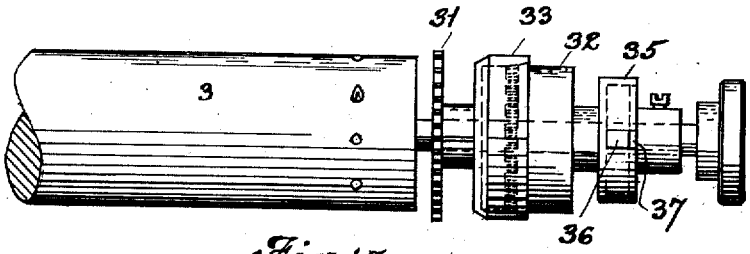
Figure 14:
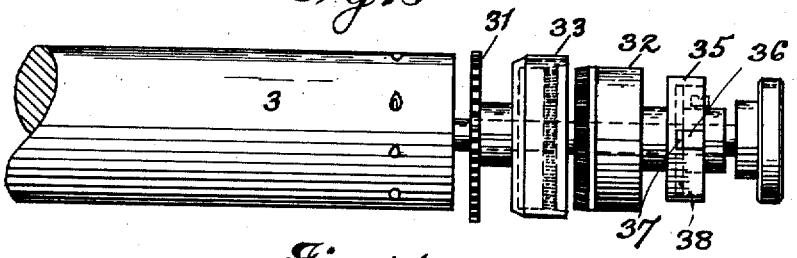
Figure 15:
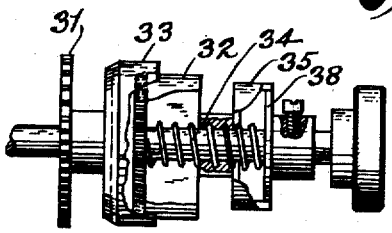
Figure 16:
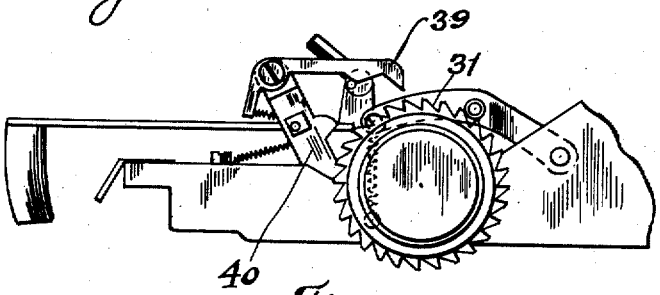

Figs. 9 and 10 are detail views of the alternating mechanism for friction and pin feed operation. Fig. 11 is a detail view of a modification of the pin adjusting means. Fig. 12 is a detail view of a pin. Fig. 13 is a further detail view. Figs. 14 to 16 inclusive show detailed views of the platen control mechanism.

Like parts are indicated by similar characters of reference throughout the several views.

While the platen roll, forming the subject matter hereof, has been illustrated in the drawings as embodied in a particular make of typewriter, it is to be understood that the present pin feed platen roll in proper size is interchangeable with the platen roll of substantially all standard makes of typewriters. To this end the present pin type platen roll simulates the proportions of standard typewriter rolls and employs the same mounting and occupies the same relation to the various operating parts of the typewriting machine, and is actuated by the usual pawl and ratchet mechanism.

Referring to the accompanying drawings, 1 indicates an ordinary typewriter of which 2 is the reciprocatory platen carriage, and 3 is the platen roll revolubly mounted in the platen carriage in the usual manner. The platen roll comprises a supporting shaft 4 which is revolubly mounted in suitable bearings in the typewriter carriage from which the original friction feed platen roll has been removed. The shaft 4 carries at each end the usual knobs 5 by which the platen may be manually rotated.

Concentrically surrounding the shaft 4 is a cylinder 6 which may be rubber covered as is usual in typewriter constructions, but for manifolding purposes for which the present feeding mechanism is especially adapted, such cylinder may be of metal to afford a harder abutment or contact surface for the impingement of the typewriter type. The cylinder 6 is fixedly connected to the shaft 4 for unison rotation therewith by a head 7, pressed, brazed or otherwise secured in one end of the cylinder 6, and immovably mounted upon the shaft 4 by means of the set screw 8. Obviously other methods of mounting may be utilized. The cylinder 6 is further supported by additional heads 9—9 secured interiorly of the cylinder 6 and journaled upon a tubular sleeve 10 surrounding the supporting shaft 4. The sleeve 10 is preferably bushed at each end as at 11 to afford a journal bearing about the shaft 4.

The bearing bushing 11 of the tubular sleeve 10 upon the shaft 4, and the journal bearing of such sleeve 10 within the cylinder head 9 enable a rotary or rocking adjustment of the tubular sleeve 10 within the cylinder independently of the cylinder 6 and of the supporting shaft 4.

As illustrated in Fig. 8 the lateral faces of the cylinder head 9 are radially grooved at 12 to provide guide ways for reciprocatory feeding pins 13 mounted therein, which in their outward lineal travel are projected beyond the periphery of the cylinder 6 through circumferentially spaced holes 14 each of which registers with a guide groove 12 in a head 9. The heads 9 are preferably flanged at 15 and provided with holes registering with the guide groove 12 and with the cylinder holes 14 thus forming a bearing surface entirely around each pin.

The pins 14 are tapered or pointed at their outer extremities to facilitate their engagement in the punched holes or apertures of punched paper with which the present platen is to be employed. The pins are also provided with lateral notches 16 for engagement over the lateral flange of a box cam 17. There is a box cam 17 adjacent to each of the pin carrying heads 9. These box cams 17 are pinned or otherwise fixedly secured to the lock sleeves 10—10. As illustrated in Figs. 6 and 8 the cam 17 engaging within the lateral notches 16 of the pins is of eccentric formation, and as the pins travel about such cam which is normally held stationary during the rotation of the cylinder, the pins are automatically reciprocated in their bearings in the heads 9. As the pins approach the extended portion 17*a* of the cam in their rotary travel, the pointed ends of the pins are projected beyond the periphery of the cylinder 6 and into engagement with the paper webs extending about the platen roll. As the pins pass beyond the portion 17*a*, they are automatically retracted, and during their travel about the concentric portion 17*b* of the cam, the pins are held in their inner position with their pointed ends retracted inwardly past the periphery of the cylinder and hence in inoperative relation and out of engagement with the punched or apertured paper. Normally the cam 17 is so positioned that its extended portion 17*a* agrees with the writing position so that the pins are projected outwardly as they approach the writing line and engage the apertured paper only at the writing line and closely adjacent thereto, the pins being retracted as they move beyond the writing position. The automatic retraction of the pins serves to strip the apertured paper from the pins without the necessity of a stripper plate or other means for dislodging the paper from the pins as ordinarily employed in pin wheel feed devices. In typewriter constructions the record paper conforms closely to the platen roll throughout a very considerable circumferential extent usually approximating one-half to two-thirds of the circumference of the platen roll. It is quite impractical if not impossible to feed apertured paper or record strips over a pin wheel feed device throughout such extended contact line wherein the paper would necessarily engage a very considerable number of pins. There are several reasons for this difficulty, one of which is that the difference between the points of the radially disposed pins is somewhat greater than between the bases of the pins at the peripheral line of the pin wheel or roller. Consequently the engaging points are spaced apart a greater distance than the holes of the paper which are spaced to agree with the bases of the pins at the peripheral line of the pin wheel or roller. Therefore there is a considerable tendency to tear or mutilate the holes in the paper and a great deal of friction develops. A further great difficulty arises from the fact that however carefully the paper may be printed and punched, slight inaccuracies of spacing of the holes and resulting lack of registry of the apertures or holes of different strips necessarily occur. When the holes of superposed apertured strips are in registry at one point, they are quite likely to be out of registry at other points only a few holes distance away and are certain to be out of registry when each sheet travels an increased circumferential distance around a cylinder platen. Consequently although the art shows platent rolls for typewriters having pin studs projecting in circumferentially spaced relation entirely about the circumference of the roll or wheel, such constructions have been found impractical and commercially inoperative in typewriters of the usual construction. These difficulties as well as others incident to the use of the pin wheel feed devices for standard typewriting machines have been overcome in the present construction by providing for the progressive projection and retraction of the pins as they approach and recede from the writing line or position upon the platen roll. While the extended portion 17*a* of the cam may be made of any suitable extent, the preferable construction is one wherein only one or not more than two pins 13 are in fully extended position at one time while an additional pin is being projected outwardly and another pin being simultaneously retracted as is illustrated in Fig. 6. This progressive extension and retraction of the feeding pins is of material advantage and especially so in adapting a pin feed platen roll to standard typewriter construction. The ordinary typewriter construction approaches quite closely to the surface of the platen roll and does not provide the necessary clearance for the projecting ends of the pins, if the pins are to remain extended throughout their entire path of travel. In the present construction, however, the pins are automatically retracted after performing their feeding operation and before they reach any interfering part of the typewriter construction. They are held in such retracted position entirely within the circumference of the platen roll until they again approach the writing position when they are extended into operative engagement with the apertured paper. Thus the pins being retracted clear, without interference, all associated parts of the typewriter construction including the usual pressure roller employed in standard typewriters for friction feed operation. The pressure roller 18 in the standard typewriter construction is adjustable toward and from the platen roll and when used for friction feeding of the paper supply it bears against the paper gripping the latter between the pressure roller 18 and the platen roll to advance the paper as the latter rotates. Although the pressure roller 18 is located in such position that there is no interference with the feeding pins 13 which are not projected beyond the periphery of the platen roll until they have passed beyond the position of the pressure roller 18, the pressure roller 18 is held out of contact with the paper and out of operative relation with the platen roll when the feeding pins 13 are employed. Pin wheel feed operation and friction feed operation are inconsistent with each other and, although there is no physical interference between the feeding pins and the pressure roller in the present construction, they can not be used simultaneously with any great degree of success. One of the advantages of pin wheel feed devices is the capability of relatively adjusting the record strips to maintain accurate registry of printed forms and also registry of the tear-off lines of both the paper and the interleaved carbon material when used. If the superposed record strips are confined by the pressure roller 18 while being engaged and fed by the feeding pins 13, the superposed strips are not free for relative adjustment as succeeding holes or apertures are engaged by the pins and consequently the holes will not exactly register with each other or with the pins and the paper will be torn. The friction or tension imposed upon the strips by the pressure roller when engaged with the paper defeats the dominant purpose of the feeding pins. Consequently when the pins 13 are employed for feeding and alining the superposed strips of material, the pressure roller 18 is disengaged from the platen roll and is held in an inoperative spaced relation with the platen roll by the adjusting means ordinarily provided on every standard typewriter. This adjusting means for the pressure roll is controlled by a finger lever 19 on the carriage, which when depressed, moves the pressure roller 18 away from the platen roll and holds it in such position until the lever 19 is again elevated.

In order that the typewriter may be used in the usual manner, employing the pressure or friction roller 18 for frictionally feeding the paper about the platen roll, means is provided for shifting the feeding pins 13 to an inoperative position. It is for this purpose that the tubular sleeve 10 is journaled for rocking adjustment about the shaft 4 and within the cylinder heads 9. By rocking the tubular sleeve 10, the control cams 17 fixedly attached thereto are also turned relative to the platen roll to such position that the pins 13 are held retracted as they pass the entire area contacted by the paper strips which conform to the periphery of the roll and are projected beyond the periphery of the roll only in an inoperative position beyond the writing line where they clear the paper strips. Such inoperative position of the cam 17 is shown in Fig. 6. To rock the sleeve 10 and with it the cams 17 to change the operative position of the pins relative to their path of travel, a manually operable lever arm 20 is provided at the end of the cylinder and secured to the extremity of the tubular sleeve 10. This lever arm projects above the level of the platen roll and is easily accessible by the operator for swinging movement in a fore and aft direction thereby giving to the sleeve 10 and the cams 17 partial rotation. Any sort of detent means may be employed for locking the lever 20 in its adjusted position and so holding the cams 17 immovable while the roll or cylinder rotates thereabout. In the drawings this detent has been illustrated as a slotted bar 21 having therein notches in which a stud 22 upon the shift lever 20 is engageable to hold the cams 17 in different positions of rocking adjustment.

In lieu of the lever locking detent there is illustrated in Figs. 9 and 10 a safety or "fool proof"

means which prevent the simultaneous operative engagement of the friction feed rollers and the pins with the manifolding strips. In this construction the adjusting lever 20 is formed with a segment 23 which is positioned beneath a projecting stud or screw head 24 upon the crank arm 25 by which the friction rollers are shifted into and out of operative engagement with the platen. The segment 23 is of such length that it prevents the depression of the crank arm 25 until the segment 23 is moved to an extreme position in which it passes beyond the path of movement of the stud or screw head 24. The segment 23 is provided with a notch 26 in which engages a pivoted detent member 27 mounted upon one of the platen carriage rods 28 of the typewriter and drawn into engagement with the periphery of the segment 23 by a spring 29, one end of which connects with the detent 27 and the other end of which is connected to the segment 23. The detent 27 is provided with a trip finger 30. When the adjusting lever 20 is drawn to a forward position thereby turning the actuating cam to such position that the feeding pins are projected beyond the periphery of the platen roll in proximate relation with the writing line, the detent 27 drops into the notch 26 and thereby locks the segment and adjusting lever 20 in their forward position. In this position of adjustment the segment 23 extending beneath the stud or screw head 24 in the crank arm 25 prevents adjustment of the friction rollers. However by merely touching the upstanding trip finger 30 of the detent, the latter is raised from the notch 26 and the spring 29 operates to throw the segment 23 rearwardly out of the path of the stud or screw head 24 thereby turning the actuating cams and causing the pins to be retracted at the writing position and to be projected only at an inoperative position. The movement of the segment 23 leaves the crank arm 25 free for oscillatory movement to adjust the friction rollers into operative relation with the platen.

While as before stated the platen roll herein described is intended to be interchangeable with the ordinary platen of any standard typewriter, when made of corresponding size, it is not limited to such substitute use but may be embodied in other writing machines such as automatic recording apparatus, billing machines, computing machines, autographic registers and various other installations employing continuous web paper supply. The radially disposed reciprocatory feeding pins are preferably, though not necessarily, arranged in two spaced rows. They may, however, comprise either a single series or multiple series and may be projected beyond the periphery of the roll at any circumferential point but preferably at a point in proximate relation to the writing line in which the type strike upon the paper about the platen at which point registration is required. By revolubly adjusting the position of the actuating cams about which the pins are carried by the rotation of the platen, the selected position in which the pins project may be changed at will. Being retractive at all points except the selected position, the pins avoid interference with adjacent structural parts of the typewriter. The construction permits the use of the ordinary friction feed device for advancing the paper to position in which it is engaged by the pins when loading the machine. It also provides an interlocking arrangement whereby the friction feed rollers are maintained in non-operating position when the feeding pins are engaged with the paper and vice versa. This construction enables the use of interleaved carbon paper punched similarly to and of full width of the manifolding form which has heretofore been impractical. It also enables the use of tabbed carbon paper to facilitate the separation of the interleaved carbon sheets from the record sheets after separation from the supply strips and further enables the use of interleaved punched carbon paper which is unglued or unattached to the printed form as has heretofore been the custom to prevent side shifting. The rectilinear movement of the feeding pins into and out of the platen has much greater alining capacity as to the number of copies of manifolding forms that can be properly fed and permits the use of platens of small diameter without the difficulties encountered in ordinary radial pin constructions wherein the pins enter and leave the feed holes in a lateral or swinging movement thus requiring greater clearance or variation of size between that of the holes and the pins. It further obviates the necessity for stripper devices since the pins are automatically withdrawn from the paper at the proper points.

In the present construction registration is attempted upon substantially a single line only, or in any event throughout only a very small portion of the circumferential arc of the platen roll. When it is attempted to feed punched paper circumferentially about a platen roll having fixed radial feeding pins, as distinguished from feeding the material tangentially past the pin wheel feed devices, the discrepancies occurring in the relative spacing of succeeding printed forms and between succeeding feeding apertures as well as the relative displacement of forms and apertures of different strips, due to the travel of succeeding strips through paths of increased diameter are distributed substantially equally between the number of pins engaged in the paper at the same time. Thus in such construction the multiple fixed pins, by their engagement with the strips, actually prevent proper registration of superposed forms and accurate alinement at the writing position is quite impossible.

In standard types of typewriters which depend solely upon friction feed means for advancing the record material, means is provided for releasing the friction feed devices to enable the paper or other record material to be adjusted relative to the platen roll to register the writing line upon the record sheet or upon a printed form with the writing position of the platen. Obviously such relative adjustment of punched forms adapted for pin wheel feed devices is quite impossible. The necessity, however, remains for properly alining or registering the writing lines of printed forms and the like with the point of impact of the typewriter type. In many standard makes of typewriters there are embodied line locating means which generally consist of some friction clutch or similar device for disconnecting the line spacing and feeding ratchet of the platen roll from the body of the roll or from other paper feeding devices which may be employed. Inasmuch as it is quite impossible to shift the paper relative to the roll in a construction wherein rotary pin feed devices are employed the pins of which enter apertures in the record material, it is necessary to change or readjust the relative position of the pin carrying platen to that of the feeding ratchet in order that the typewritten impressions may appear in proper relation with lines upon the printed form.

As is illustrated in the detail view, Fig. 13, there is shown a friction clutch which adjustably connects the line spacing ratchet wheel 31 with the platen roll and comprises a male member 32 spring pressed into the female portion 33 of the clutch, the contacting surfaces being provided with friction material coating or with fine line knurling so that they may be fixedly interengaged with each other in different positions of revoluble adjustment to maintain the selected relation of the ratchet wheel and platen roll. By releasing the friction clutch members 32 and 33 the pin carrying roll may be adjusted revolubly relative to and independent of the line spacing ratchet 31. This enables the lines of a printed form to be adjusted to proper registry with the impact point of the typewriter type.

A typical construction is illustrated in Figs. 13 to 16 inclusive wherein the male member 32 of the clutch is slidingly mounted upon the shaft of the platen roll and may be retracted against the tension of a helical spring 34 out of engagement with the female member 33 of the clutch. The female member 33 is fixedly connected with the ratchet wheel 31 and loosely journaled upon the platen roll shaft except for its connection therewith through the interengagement of the clutch members 32 and 33. The member 32 is provided with an enlargement or knob 35 having therein a slot 36 in which slidingly engages the key lug 37 on the collar 38. The latter is secured upon the platen roll shaft and serves to couple the clutch members therewith for unison rotation but permits axial sliding movement of the clutch member 32 into and out of engagement with the member 33. In Fig. 16 there are shown the actuating pawl 39 for operative engagement with the ratchet wheel 31 and also a detent 40 engaging with the ratchet wheel 31 to retain it in its adjusted position. This construction of the line adjusting means is herein shown and described for illustrative purposes only and does not, per se, form any part of the present invention except so far as it is inter-related with the operation of pin feed mechanism. In the modification disclosed in Fig. 1, the carrier 50 is carried by the carriage 2 through the arms 52 so that as the carriage 2 is actuated to and fro in the typewriter, the paper supply carrier 50 moves in unison therewith.

A means for holding the punched manifold paper webs in feeding position with the pins without the use of frictional feed has been disclosed in Fig. 1 and includes pivotally mounted arms 54 carried on a cross rod 56 that in operative position, as disclosed to the left of Fig. 1, has a curved surface 58 that follows the contour of the roll to hold the record material in contact with the pins.

In order that the punched paper may be supplied uniformly to the platen roll throughout the range of travel of the typewriter carriage, and to insure against such binding or straining of the supply material as would interfere with free movement of the paper onto and off the feeding pins and the relative adjusting movement necessary for maintenance of proper registration, it is desirable that the supply of material be conducted to the platen roll over a suitable guide device as is shown in Fig. 1 which may be stationarily located in distantly spaced relation with the roll as may also be located the supply packet or roll of manifolding material. However, the preferable method of suplying material is to provide a traveling carrier operatively connected with and actuated to and fro in unison with the platen carriage. Such traveling carrier 50 may be mounted independently of the typewriter, or may be supported directly upon the typewriter frame. Such traveling carrier constructions 50 are fully shown and described in copending applications, Serial No. 460,764 and Serial No. 519,488 to which reference may be had for detail description, such constructions forming no part of the present invention, per se, except so far as it is related to the feeding operation of the present pin type platen roll and hereinafter claimed in combination therewith.

In the modification disclosed in Fig. 1, the carrier 50 is carried by the carriage 2 through the arms 52 so that as the carriage 2 is actuated to and fro in the typewriter, the paper supply carrier 50 moves in unison therewith.

A means for holding the punched manifold paper webs in feeding position with the pins without the use of frictional feed has been disclosed in Fig. 1 and includes pivotally mounted arms 54 carried on a cross rod 56 that in operative position, as disclosed to the left of Fig. 1, has a curved surface 58 that follows the contour of the roll to hold the record material in contact with the pins.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

Having thus described my invention, I claim:

1. The combination with a platen roll for a writing machine wherein the record material provided with apertures is fed circumferentially about the roll, of a series of reciprocatory pins mounted radially in said roll and means for automatically projecting the pins beyond the periphery of the roll and positively retracting the pins successively as the roll rotates whereby the pins enter the apertures in a direction coincident with the radius of curvature of the record material.

2. A platen roll for a writing machine, means for feeding the record material circumferentially about the roll, including a plurality of retractable feeding pins for engagement with record material, and means for positively reciprocating the pins rotating in unison with the rotation of the roll in a path coincident with the radius of curvature of the record material.

3. A platen roll for typewriting machines, and rectilinearly retractable feeding and aligning means carired by the roll having positive engagement with recording material to feed it circumferentially around said platen roll and to align the record material, and actuating means therefor by which the feeding means is rendered operable at a point of the platen adjacent the writing line only, said feeding means retracting along a path coincident with the radius of curvature of the record material.

4. A platen roll for typewriting machines and radially extensible and retractable tapering feeding pins carried by said roll, said pins projecting beyond the periphery thereof adjacent to the writing line only for engagement with record material to feed the same circumferentially disposed about the platen roll and to align the record material.

5. A platen roll for a writing machine, a series of feeding and aligning pins carried thereby and movable radially relative to the roll into and out of engagement with record material to feed the same circumferentially about the roll and to align the record material when in writing position, and means for positively retracting the feeding pins to strip the record material therefrom.

6. A platen roll for a writing machine, and a plurality of reciprocatory feeding and aligning pins mounted therein and actuating means for positively advancing and retracting the pins responsive to the rotation of the platen roll.

7. A platen roll for a writing machine, and a plurality of reciprocatory feeding and aligning pins mounted therein and actuating means for positively advancing said pins into operative engagement with record material disposed circumferentially about the roll, and means by which the pins are positively retracted out of engagement with the record material to strip the material therefrom responsive to the rotation of the roll.

8. A platen roll for a typewriting machine wherein the record material follows a curvilinear path when passing therethrough, a plurality of groups of strip feeding pins mounted therein for reciprocatory motion, and a cam for each group with which the pins thereof continuously engage and about which they are caused to travel by the rotation of the platen by which the pins are progressively advanced and retracted responsive to the rotation of the platen roll.

9. A platen roll for a typewriting machine wherein the record material follows a curvilinear path when passing therethrough, a plurality of groups of strip feeding pins mounted therein for reciprocatory motion, and a cam for each group with which the pins thereof continuously engage and about which they are caused to travel by the rotation of the platen, said cam operating to alternately advance and retract each pin of its group responsive to the rotation of the platen roll.

10. The combination with a platen roll for a typewriting machine, of reciprocatory pin studs carried by the platen roll for feeding and aligning superposed webs of manifolding material circumferentially of the roll, and maintaining the webs of material in registry at the writing line, said pin studs being adapted to engage the webs of manifolding material for a portion only of that portion thereof which conforms to the contour of the platen roll.

11. A feeding device for an apertured web, including a carrier, a plurality of reciprocating feeding pins therein engageable in the apertures to feed the web past an imprinting point, and control means for positively retracting the pins to strip a portion of the web, still in contact with the carrier, from the feeding pins after it has passed the imprinting point.

12. A feeding device for an apertured web of record material, including a rotary carrier about which the web is fed in circumferential relation, a plurality of retractable feeding pins upon the carrier progressively engageable in the apertures of the web for feeding the same, and positive actuating means for progressively retracting the pins to strip the web from the feeding pins by the rotation of the carrier before the web separates from the carrier, said pins being retracted along a path coincident with the radius of curvature of the record material.

13. In a writing machine having lateral aligning means for a supply of punched record material for maintaining the punchings thereof in position, the combination of a platen roll with feeding pins mounted therein for reciprocal motion into and out of feeding contact with the punched record material fed circumferentially about the platen roll, the axis of the pins being coincident with the radius of curvature of the record material when progressively engaging the same.

14. In a writing machine, a pin wheel feeding mechanism, including a plurality of groups of movable feeding pins for continuously and progressively advancing record material through the writing machine, and a cam for each group having a closed loop-like cam surface for positively controlling only the movement of its group of pins.

15. In a writing machine, a platen rotating about an axis, a pin wheel feeding mechanism associated with said platen, said pin wheel feeding mechanism including a plurality of movable pins for advancing record material through the writing machine, a cam having a closed, loop-like cam enclosing said axis for controlling the movement of the pins.

16. In a writing machine, a platen roll, means for feeding record material circumferentially about said platen so that the record material is curved about the platen, characterized by tapering pins advancing into and retracting from apertures provided therefor in the record material to feed and align the same, the axis of the pins coinciding with the radius of curvature of the record material when in contact therewith.

17. In a writing machine, a feed roll about which record material is advanced circumferentially, characterized by tapering pins engaging the record material in contact with the roll, said pins being advanced and retracted in a path coinciding with the radius of curvature of the material engaged so as to prevent mutilation of the record material.

18. A platen roll for a writing machine, a series of tapering feeding and aligning pins carried thereby and movable radially relative to the roll, said pins loosely engaging apertures provided therefor in record material to align and feed the same circumferentially about the roll, and means for retracting the feeding pins to withdraw the same from the record material.

19. A platen roll for a writing machine, and a plurality of reciprocatory tapering aligning and feeding pins mounted therein for loosely engaging apertures provided therefor in record material advancing circumferentially about the roll, and means for advancing and retracting the pins responsive to the rotation of the platen roll.

20. A platen roll for a writing machine, and a plurality of reciprocatory aligning and feeding pins mounted therein for loosely engaging apertures provided therefor in record material, actuating means for advancing the pins into operative engagement with the record material disposed circumferentially about the platen roll, and means for retracting the pins out of engagement with the record material to strip the material therefrom responsive to the rotation of the platen roll.

21. A feeding device for an apertured web including means for guiding the web through a curved path while advancing through the device, a carrier, a plurality of reciprocating tapering aligning and feeding pins therein loosely engageable in the apertures to align and feed the web, and control means for retracting the pins to strip a portion of the web still in contact with the carrier from the pins after it has passed an imprinting position, said pins entering and retracting in a path coincident with the radius of curvature of the web.

22. In a writing machine, means for guiding writing material therethrough in an arcuate path of travel, a series of traveling feeding and aligning pins moving about an axis concentric with the arcuate path of the writing material and extending radially relative thereto, means for radially reciprocating the pins into and out of engagement in spaced holes in the writing material simultaneously with their travel about said axis for aligning superposed sheets of material and advancing them through their arcuate path of travel.

23. A platen roll for typewriting machines, feeding and aligning means carried by the platen roll having positive engagement with record material to feed it circumferentially around said platen roll and to align the record material, and actuating means by which the feeding and aligning means extend in a path coincident with the radius of curvature when in engagement with the record material when passing through said circumferential path.

24. In a writing machine, a pin feeding device for feeding record material through a curvilinear path through the writing machine and means for actuating said pins to feed the record material, said means causing the axes of the pins to coincide with the radius of curvature of the record material when in engagement therewith, said pins having a rectilinear movement with respect to the record material when entering and leaving the same.

25. In a writing machine through which record material advances through a curvilinear path, the combination of a plurality of pins for engaging the record material, said pins being actuated in a direction such that the axes of the portion of pins in engagement with the record material when advancing through the curvilinear path substantially coincides with the radius of curvature of the record material, said pins having a relative movement with respect to at least a portion of the record material passing along the curved path.

26. A platen roll for an imprinting machine having in the periphery thereof a series of circumferentially spaced holes, an endless traveling series of pins progressively engageable in longitudinally spaced holes in a sheet of record material to be fed past an imprinting position, said pins having engagement in the spaced holes in the platen and actuated in unison with rotation thereof through a circuitous path of travel eccentric to the platen roll and intersecting the periphery thereof coincident with the area of engagement of the pins with the record material.

27. A platen roll for an imprinting machine having in the periphery thereof a series of circumferentially spaced holes, an endless traveling series of pins progressively engageable in longitudinally spaced holes in a sheet of record material to be fed past an imprinting position, said pins having engagement in the spaced holes in the platen and actuated in unison with rotation thereof, and a swinging support upon which the traveling pins are mounted for travel through a circuitous path of travel eccentric to the platen roll and intersecting the periphery thereof, by the swinging adjustment of which relative to the platen roll the pins may be shifted into and out of engaging relation with the record material.

28. A platen roll for an imprinting machine having in the periphery thereof a series of circumferentially spaced holes, an endless series of traveling pins engaging in said holes and actuated by rotation of the platen through a path of travel intersecting the path of travel of a sheet of record material being advanced about the platen roll and having therein a series of spaced holes progressively engaged by the pins to advance the sheet past an imprinting position, and means for varying the path of travel of the pins toward and from the area of engagement of the pins with the record material.

29. A platen roll for an imprinting machine having in the periphery thereof a circumferential series of spaced holes, an endless traveling series of pins located interiorly of the platen roll and rotating in unison therewith through a path of travel eccentric to the platen roll and intersecting the periphery thereof through the holes of which the pins are progressively projected into engagement with longitudinally spaced holes in a sheet of record material to be fed past a writing position.

30. A feeding device for use with stationery having a succession of spaced holes therein including a cylindrical platen having in the periphery thereof a circumferential row of spaced holes, an endless series of traveling pins coacting therewith, the pins having simultaneous engagement in both the holes in the platen and the holes in the stationery for positively advancing the stationery past an imprinting position by rotation of the platen.

31. A platen roll for a writing machine having in the periphery thereof a circumferential row of spaced holes, a pin type feeding device including an endless series of traveling pins progressively engageable in longitudinally spaced holes in a sheet of record material to be advanced past a writing position, and means for directing the pins in a path of movement substantially tangential to the surface of the platen at the point of engagement of the pins with the record material, the platen roll and series of traveling pins being subject to unison travel movement transmitted from one to the other wherein successive pins will simultaneously engage holes in the record material and holes in the platen roll.

32. In a writing machine, a platen roll having therein a circumferential series of spaced holes, a traveling series of record material engaging pins having intermeshing engagement with the holes of the platen roll by rotation of which the pins are actuated through a circuitous path of travel eccentric to that of the platen roll wherein the pins are progressively engaged in and disengaged from longitudinally spaced holes in a record sheet disposed about the platen to effect advancement of the record sheet past a writing position in unison with the rotation of the platen.

33. A platen roll for an imprinting machine having in the periphery thereof a series of circumferentially spaced holes, an endless series of traveling pins engaging in said holes and actuated by rotation of the platen, through a path of travel intersecting the path of travel of a sheet of record material being advanced about the platen roll and having therein a series of spaced holes progressively engaged by the pins to advance the sheet past an imprinting position.

34. A platen roll for a writing machine having in the periphery thereof a circumferential row of spaced holes, an endless series of traveling pins engageable in the holes in the platen roll and actuated by rotation of the roll and simultaneously engageable in corresponding spaced holes in a record sheet to positively advance the sheet past a writing position.

35. In a writing machine a platen roll having therein a circumferential series of spaced holes, an endless series of traveling feeding pins engageable in corresponding holes in a record sheet disposed about the platen and traveling through a path eccentric relative to the platen wherein the pins intermesh with the holes in the platen simultaneously with their engagement in holes in the record sheet.

36. A platen roll for a writing machine having in its periphery a circumferential row of spaced holes, a rotary series of spaced pins located interiorly of the platen roll and actuated in unison therewith by the rotation of the roll, the path of travel of said rotary series of pins being eccentric to the platen roll and intersecting the periphery thereof at a record material feeding position at which the pins are progressively projected through said holes and beyond the periphery of the platen roll into engagement with spaced holes in a sheet of record material to be advanced past a writing position and subsequently disengaged therefrom upon continued rotation of the platen roll.

37. A writing machine of the type wherein a rotary platen roll and associated frictional pressure rollers are usable to progressively advance past a writing position a strip of record material having therein a succession of longitudinally spaced holes, characterized by a pin type feeding device for positively advancing the strip relative to the writing position including a series of traveling reciprocatory pins, actuated through a circuitous path of travel in synchronism with the rotation of the platen roll and control means for the pins effecting longitudinal motion thereof incidental to their travel motion, into and out of operative engagement in the longitudinally spaced holes in the strip.

38. The combination, in an imprinting apparatus operative upon superposed strips of material having therein longitudinally spaced feed holes, with a series of such strips, of strip feeding means including a rotary carrier, having therein a series of circumferentially spaced holes, an endless series of relatively spaced traveling feeding pins advanced in unison with the rotation of the carrier in a path of travel eccentric thereto wherein the pins are progressively projected into and retracted out of simultaneous engagement in succeeding spaced holes in the carrier and succeeding spaced holes in the strips of material, by the advance travel movement of which the strips are adjusted relative to each other into registry simultaneously with their advancement, the holes in the strips being of such size and shape as to enable the pins to enter into and withdraw therefrom without mutilation of the superposed strips.

39. The combination in an imprinting apparatus operative upon superposed strips of material having therein longitudinally spaced feed holes, with a series of such strips, of strip feeding means, including a revoluble cylindrical member having therein a circumferential series of holes spaced approximately equally with those of the strips, an endless series of relatively spaced feeding pins mounted interiorly of the revoluble cylindrical member and advanced in unison with the rotation thereof in a path of travel eccentric thereto and intersecting the periphery of the revoluble cylindrical member, during which travel motion the pins are progressively projected through the holes in the cylindrical member into feeding engagement in the holes of the superposed strips by the travel movement of which the strips are relatively adjusted into registry with each other simultaneously with their advancement, the holes in the strips being of such size and shape as to enable the pins to enter into and withdraw therefrom without mutilation of the superposed strips.

40. The combination, in an imprinting apparatus operative upon superposed strips of material having therein longitudinally spaced feed holes, with a series of such strips, of strip feeding means, including a rotary platen about which the strips are circumferentially advanced, an endless series of traveling reciprocatory feeding pins mounted for travel motion through an orbit in offset relation with the platen roll and actuated by the rotation thereof, during which travel motion the pins are progressively reciprocated into and out of feeding engagement in the holes in the superposed strips by the travel motion of which the strips are relatively adjusted into registry with each other simultaneously with their advancement, the holes in the strips being of such size and shape as to enable the pins to enter into and withdraw therefrom without mutilation of the superposed strips.

41. The combination with a rotary platen having therein a series of circumferentially spaced holes, circumferentially about which superposed strips of record material having therein longitudinally spaced feed holes are progressively advanced, of a series of said strips, a plurality of traveling feeding pins advanced in unison with rotation of the platen and progressively projected from and retracted into the holes in a restricted portion only of the periphery of the platen roll into and out of feeding engagement in the longitudinally spaced holes in the strips, the holes in the strips and the pins being of such size and shape as to enable the pins to enter into and withdraw from the holes without mutilation of the superposed strips.

42. The combination of a series of superposed strips having therein longitudinally spaced feed holes and a feeding sprocket circumferentially about which the superposed strips are progressively advanced including a plurality of reciprocatory feeding pins traveling in unison with the sprocket and axially projected progressively from a restricted portion only of the periphery thereof into feeding engagement in the longitudinally spaced holes in the strips and retracted therefrom by the rotation of the sprocket, the size and shape of the pins and holes being such as to enable the pins to enter into and withdraw therefrom with minimum mutilation of the superposed strips.

43. In an apparatus for making manifold records upon superposed strips of record material intermittently advanced past an impression receiving position and for correcting the differential in longitudinal travel of individual superposed strips of a manifolding assembly which occurs when such strips are passed about the curved surface of a cylindrical platen, including in combination a rotary cylindrical platen, a plurality of said strips having longitudinally spaced holes therein progressively advanced about the platen and past an imprinting position while in conformity with a segmental portion of the circumference of the cylindrical platen, and a traveling series of spaced feeding pins advanced in unison with the rotation of the platen and progressively engageable in corresponding spaced holes in the superposed strips throughout only a fractional portion of the circumferential segment through which the strips conform to the platen roll, for equalizing the advancement of the strips and presenting corresponding portions of the superposed strips in registry at the imprinting position.

44. In an apparatus for making manifold records upon superposed strips of record material progressively advanced past an impression receiving position, and for automatically correcting the differential longitudinal travel of individual superposed strips of a manifolding assembly which occurs when superposed strips are passed about the curved surface of a cylindrical platen including in combination a rotary cylindrical platen, a plurality of said strips having longitudinally spaced feed holes therein progressively advanced about the platen and past an imprinting position while in conformity with a segmental portion of the circumference of the cylindrical platen, in advance of the imprinting position and a plurality of traveling spaced feeding pins located beyond the imprinting position and advanced in unison with the rotation of the platen, progressively engageable in corresponding spaced holes of the imprinted portions of the superposed strips, for drawing the strips in unison about the platen and into the imprinting position and equalizing the advancement thereof to present corresponding portions of the strips in registry at the imprinting position.

45. In an apparatus for making manifold records upon superposed strips of record material progressively advanced past an impression receiving position, and for automatically correcting the differential longitudinal travel of individual superposed strips of a manifolding assembly which occurs when superposed strips are passed about the curved surface of a cylindrical platen, a plurality of said strips having longitudinally spaced feed holes therein progressively advanced about the platen and past an imprinting position while in conformity with a segmental portion of the circumference of the cylindrical platen, and a traveling series of spaced reciprocatory feeding pins advanced in unison with the rotation of the platen and progressively extended and retracted axially into and out of engagement in corresponding holes in the superposed strips for advancing the strips in unison relative to the platen and equalizing the advancement thereof to present corresponding portions of the strips in registry at the imprinting position.

46. In an apparatus for making manifold records upon superposed strips of record material progressively advanced past an impression receiving position and for automatically correcting the differential longitudinal travel of individual superposed strips of a manifolding assembly which occurs when superposed strips are passed about the curved surface of a cylindrical platen including in combination a cylindrical platen having in its periphery a circumferential series of spaced holes, a plurality of such strips having therein longitudinally spaced holes substantially agreeing with the spacing of the holes in the platen progressively advanced about the platen and past the imprinting position while in conformity with a segmental portion of the cylindrical platen, and a traveling series of feeding pins advanced in unison with the rotation of the platen and engaging simultaneously in corresponding holes in the platen and in the strips through only a fractional portion of the circumferential segment through which the strips conform to the platen roll, for advancing the strips in unison about the cylindrical platen and simultaneously equalizing the advancement thereof to present corresponding portions of the strips in registry at the imprinting position.

JOHN Q. SHERMAN.